United States Patent
Akiyama et al.

(10) Patent No.: US 7,618,733 B2
(45) Date of Patent: Nov. 17, 2009

(54) FUEL CELL

(75) Inventors: Eiji Akiyama, Tokyo (JP); Satoshi Tomoeda, Tokyo (JP); Takashi Manako, Tokyo (JP); Tsutomu Yoshitake, Tokyo (JP); Yoshimi Kubo, Tokyo (JP)

(73) Assignee: NEC Corporation, Tokyo (JP)

( * ) Notice: Subject to any disclaimer, the term of this patent is extended or adjusted under 35 U.S.C. 154(b) by 196 days.

(21) Appl. No.: 10/594,891

(22) PCT Filed: Mar. 31, 2005

(86) PCT No.: PCT/JP2005/006248

§ 371 (c)(1),
(2), (4) Date: Apr. 5, 2007

(87) PCT Pub. No.: WO2005/096427

PCT Pub. Date: Oct. 13, 2005

(65) Prior Publication Data

US 2007/0218340 A1   Sep. 20, 2007

(30) Foreign Application Priority Data

Mar. 31, 2004   (JP) .............................. 2004-104624

(51) Int. Cl.
    *H01M 2/02*   (2006.01)
(52) U.S. Cl. ........................................................ 429/34
(58) Field of Classification Search .................... 429/12, 429/13, 34, 36
    See application file for complete search history.

(56) References Cited

FOREIGN PATENT DOCUMENTS

| JP | 48-16222 | 3/1973 |
| JP | 58-92651 U | 6/1983 |
| JP | 2001-229942 A | 8/2001 |
| JP | 2002-216823 A | 8/2002 |
| JP | 2003-331884 A | 11/2003 |

*Primary Examiner*—Patrick Ryan
*Assistant Examiner*—Monique Wills
(74) *Attorney, Agent, or Firm*—Sughrue Mion, PLLC (57) ABSTRACT

A fuel cell has a fuel electrode and an oxidizing agent electrode, a fuel supply path that supplies a liquid fuel to the fuel electrode, an oxidizing agent supply path that supplies an oxidizing agent to the oxidizing agent electrode, and an opening/closing member that, by changing its shape, opens and closes the oxidizing agent supply path. The change in the shape of the opening/closing member regulates the opening and closing of the oxidizing agent supply path.

8 Claims, 9 Drawing Sheets

FUEL CELL

This application claims priority from PCT Application No. PCT/JP2005/006248 filed Mar. 31, 2005, and from Japanese Patent Application No. 2004-104624 filed Mar. 31, 2004, which applications are incorporated herein by reference.

TECHNICAL FIELD

The present invention relates to a fuel cell and a method for operating the fuel cell.

BACKGROUND ART

A fuel cell is provided with a fuel electrode, an oxidizing agent electrode, and an electrolyte membrane provided therebetween. Fuel is supplied to the fuel electrode, and an oxidizing agent is supplied to the oxidizing agent electrode, thereby electric power generated by electrochemical reaction. Although hydrogen is generally used as the fuel, a direct type fuel cell, which directly uses alcohol such as methanol and the like being inexpensive and being easily treated as the fuel, has been also actively developed in recent years.

When the hydrogen is used as the fuel, the reaction in the fuel electrode is represented by the following formula (1).

$$3H_2 \rightarrow 6H^+ + 6e^- \qquad (1)$$

When the methanol is used as the fuel, the reaction in the fuel electrode is represented by the following formula (2).

$$CH_3OH + H_2O \rightarrow 6H^+ + CO_2 + 6e^- \qquad (2)$$

Also, in any case, the reaction in the oxidizing agent electrode is represented by the following formula (3).

$$3/2 O_2 + 6H^+ + 6e^- \rightarrow 3H_2O \qquad (3)$$

In particularly, since hydrogen ions can be obtained from an alcoholic solution in the direct type fuel cell, a reformer and the like become unnecessary and the miniaturization and weight saving of the fuel cell can be attained. Also, the direct type fuel cell has an advantage that the energy density of the fuel cell is very high since the fuel cell uses the liquid alcoholic solution as the fuel.

Japanese Unexamined Patent Publication No. 2002-216823 discloses a fuel cell provided with means adapted to close the circulation of the air at the time of stopping the fuel cell in an air supply line for supplying air to an air electrode of the fuel cell and an air discharge line for discharging the air from the air electrode. According to the conventional examples, the dryness of an electrolyte during the operation stop of the fuel cell can be prevented.

However, when the oxidizing agent electrode is constituted to be opened in the direct type fuel cell using liquid fuel such as the methanol and the like as the fuel, the direct type fuel cell has a problem that the fuel passes through the electrolyte membrane during the stop of the fuel cell and is evaporated at the oxidizing agent electrode side.

DISCLOSURE OF INVENTION

It is an object of the present invention to provide a fuel cell having a simple structure and capable of suppressing the excessive evaporation of fuel.

In the present invention, a fuel cell includes: a fuel electrode; oxidizing agent electrode; a fuel supply path for supplying the liquid fuel to the fuel electrode; an oxidizing agent supply path for supplying an oxidizing agent to the oxidizing agent electrode; and an opening/closing member for opening and closing the oxidizing agent supply path according to the shape change thereof. The shape change of the opening/closing member regulates the opening and closing of the oxidizing agent supply path. As a result, the movement of substances such as the fuel to the oxidizing agent electrode side from the fuel electrode side can be suppressed by the simple structure, and the excessive evaporation of the fuel during the operation stop of the fuel cell can be suppressed. Herein, the shape change means the expansion and contraction of the volume of the opening/closing member, the incurvation thereof and the like. Although the liquid fuel also includes misty fuel and vaporous fuel, the liquid fuel is the most effective. The oxidizing agent supply path includes not only a pipe supplying the oxidizing agent but also a contacting part of the oxidizing agent supply path and oxidizing agent electrode.

The oxidizing agent electrode may be covered with the shape-changed opening/closing member, thereby closing the oxidizing agent supply path.

Or the opening/closing member may constituted so as to be guide unit for guiding gas to a closed space formed by the opening/closing member and the oxidizing agent electrode and by guiding the gas to the closed space to open the oxidizing agent supply path. The opening/closing member may be a bag unit capable of being expanded and contracted, and the bag unit may be provided with a gas introducing means adapted to introduce gas such as the oxidizing agent. Thereby, the opening/closing member is expanded and constricted by injecting and ejecting the air such as the oxidizing agent to the bag unit. As a result, the movement of substances such as the fuel to the oxidizing agent electrode side from the fuel electrode side can be suppressed by the simple structure, and the excessive evaporation of the fuel during the operation stop of the fuel cell can be suppressed.

The opening/closing member may be a plate obtained by combining two or more plate-like members whose thermal expansion ratios are different. The plate may be the combination of a metal plate-like member and resin plate-like member, and may be the combination of the metal plate-like members. Herein, since the plate is the combination of the plate-like members whose thermal expansion ratios are different, and the temperature of the fuel cell is high during the operation of the fuel cell, the plate has a curved shape, and the oxidizing agent electrode is opened. Since the temperature of the fuel cell is low during the operation stop of the fuel cell, the plate has a linear shape, and the oxidizing agent electrode is covered with the plate. As a result, the movement of substances such as the fuel to the oxidizing agent electrode side from the fuel electrode side can be suppressed by the simple structure, and the excessive evaporation of the fuel during the operation stop of the fuel cell can be suppressed.

BEST MODE FOR CARRYING OUT THE INVENTION

Hereinafter, the embodiments of the present invention will be described with reference to the drawings. In all the drawings, the same constituent elements are provided with the same numerals, and the detailed description is suitably omitted in the following description.

A fuel cell in an embodiment of the present invention can be applied to small electric appliances such as a portable phone, a portable personal computer such as a note type personal computer, PDA (Personal Digital Assistant), various cameras, a navigation system, and a portable music reproducing player. In particular, in the small electric appliances such as the portable personal computers of the note type portable personal computer and the like, comparatively many fuel cell unit cells are used. Therefore, the fuel cell mounted in a plane is particularly useful.

Figure 1:
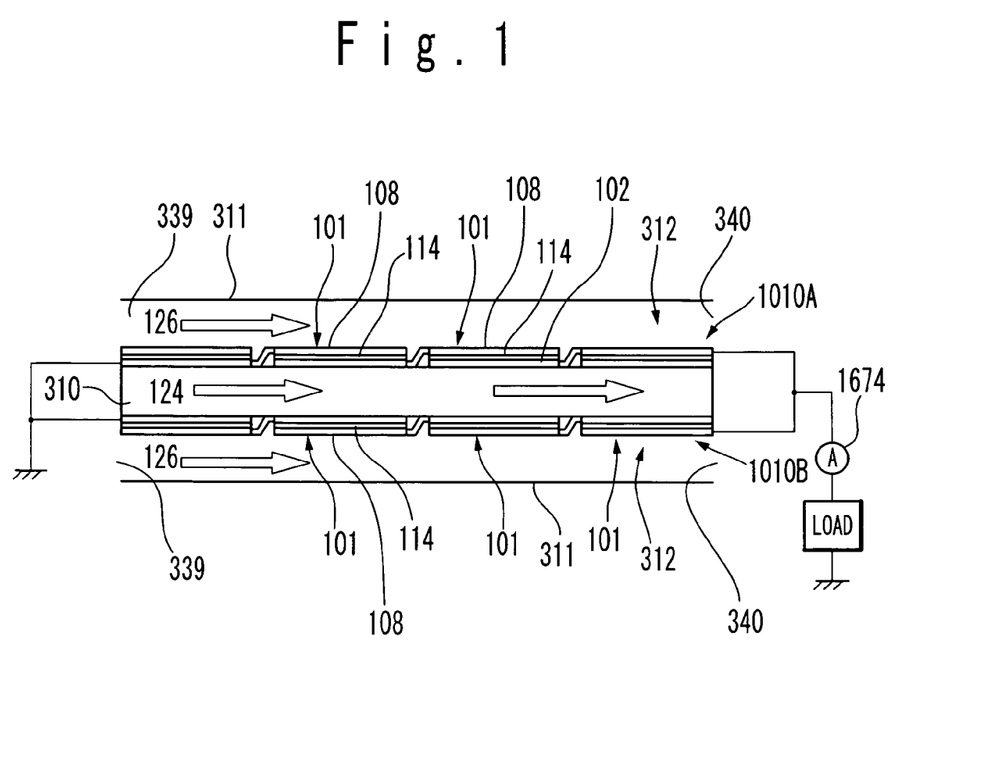
FIG. 1 is a sectional view showing diagrammatically the constitution of a fuel cell in the present invention.

FIG. 1 is a sectional view schematically showing the constitution of a fuel cell of the present invention. Referring to FIG. 1, the fuel cell includes two power generation blocks 1010A, 1010B provided in parallel. The power generation blocks are arranged in a frame 311. A plurality of cell blocks are provided in each of the power generation blocks. As shown in FIG. 1, a plurality of unit cells 101 are connected to each of the cell blocks in series. The other cell blocks are arranged in a direction orthogonal with the plane of the drawing. The number of the power generation blocks, the number of the cell blocks, and the number of the unit cells connected in series are appropriately selected according to use objects.

Oxidizing agent passages 312 are respectively formed between the frame 311 and the power generation block 1010A and between the frame 311 and the power generation block 1010B. An oxidizing agent 126 is supplied to an outlet 340 from an inlet 339 via the oxidizing agent passage 312. A fuel passage 310 is formed between the power generation blocks 1010A and 1010B. Fuel 124 is supplied in the same direction as that of the oxidizing agent via the fuel passage 310.

Each of the unit cells 101 contains a fuel electrode 102, an oxidizing agent electrode 108, and a solid electrolyte membrane 114 provided therebetween. The fuel 124 and the oxidizing agent 126 are respectively supplied to the fuel electrode 102 and the oxidizing agent electrode 108, and electric power is generated by the electrochemical reaction between the fuel and the oxidizing agent. Two sets of the power generation blocks are arranged so that the fuel electrodes 102 face with each other, and the fuel passage 310 is arranged therebetween. In the example shown in FIG. 1, the oxidizing agent electrodes of a downstream side are connected in parallel with each other, and are connected to a load via an ammeter 1674. Also, the fuel electrodes of an upstream side are connected in parallel with each other, and are connected to grounding or a low potential side wiring. In this way, electric power is supplied to the load from the fuel cell. However, the position of the ammeter 1674 is not limited to the above position, and may be the other places. Even if a member can distinguish whether the fuel cell is in operation or not, the member may not be the ammeter.

Although air is usually used as the oxidizing agent 126, oxygen gas may be supplied. In the present invention, air is used as the oxidizing agent 126. The unit cell 101 is a direct type fuel cell in which the liquid fuel is supplied to the fuel electrode 102. As the fuel 124, organic liquid fuel such as methanol, ethanol, dimethyl ether, the other alcohols or fluid hydrocarbon such as cyclo paraffin can be used. The organic liquid fuel is preferably a water solution. The frame 311 is made of a material having chemical resistance or alcohol resistance. For example, engineering plastics such as polyacetal or Teflon (registered trade name) resin are used. In some cases, a metal and a resin may be used.

First Embodiment

Figure 2A:
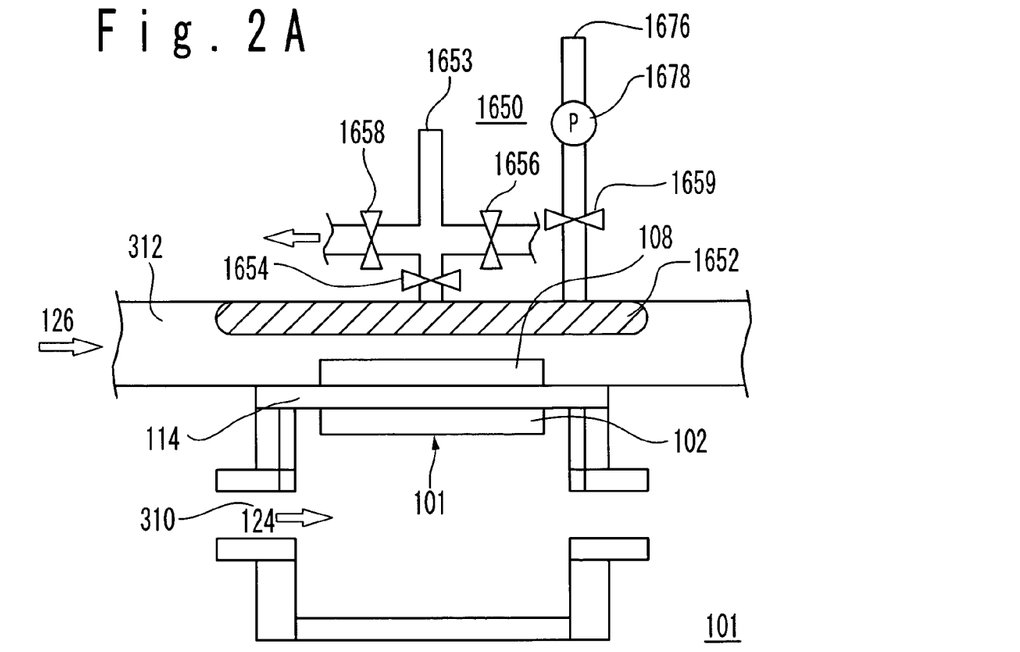
FIG. 2A shows a condition that a balloon is constricted at the time of operating a fuel cell according to a first embodiment of the present invention.
Figure 2B:
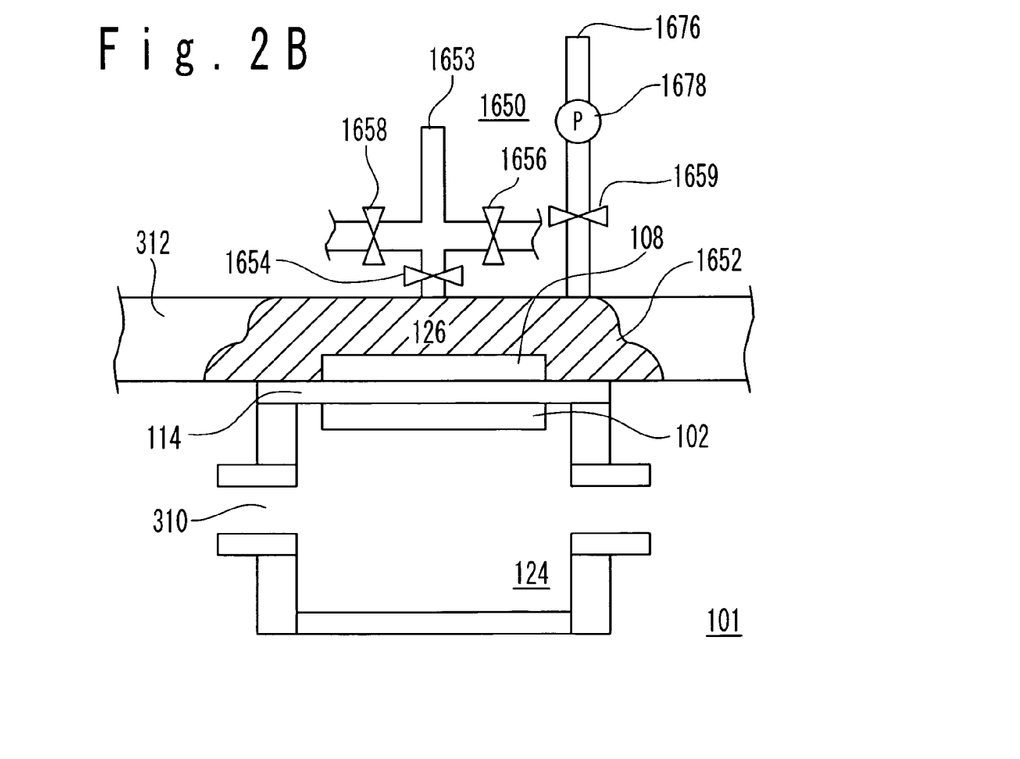
FIG. 2B shows a condition that the balloon is expanded at the time of stopping the fuel cell according to the first embodiment of the present invention.

FIGS. 2A and 2B show a condition of a balloon 1652 whose shape is changed according to an operation situation of a fuel cell according to a first embodiment of the present invention. The balloon 1652 functions as an opening/closing member. As shown in FIG. 2A, the fuel cell is provided with a unit cell 101, the balloon 1652 set at the inner side of the oxidizing agent passage 312, a changeover valve structure 1650 connected to the balloon 1652 and a balloon exhaust passage. Four passages are connected to the changeover valve structure 1650. One passage is opened, and the oxidizing agent is supplied from an opening 1653. A balloon injection solenoid valve 1654 is provided in the passage connected to the balloon 1652, and an air discharge solenoid valve 1656 is connected to the other passage. A reducing valve may be used instead of the air discharge solenoid valve 1656. An oxidizing agent passage solenoid valve 1658 is provided in the remaining passage, and this passage is connected to the oxidizing agent passage 312. A balloon exhaust solenoid valve 1659 and a pump 1678 are provided in the balloon exhaust passage, and an output port of the pump 1678 is opened as a balloon exhaust port 1676. Herein, referring to the changeover valve structure 1650, the expansion and contraction of the balloon 1652 are controlled by the opening and closing of the above four solenoid valves. Herein, the oxidizing agent introducing port 1653 and the changeover valve structure 1650 have a function as the gas guide unit. The oxidizing agent electrode 108 of the unit cell 101 is provided in the oxidizing agent passage 312, and the fuel electrode 102 is provided in the fuel passage 310. The electrolyte membrane 114 is provided along the oxidizing agent passage 312.

There is used resins such as plastics which has no breathability and has tolerance to the liquid fuel and elasticity as a material of the bag-like body balloon 1652 which is the opening/closing member controlling the supply of the oxidizing agent 126 to the oxidizing agent passage 312 according to the shape change of the opening/closing member. Specifically, a silicon resin, rubber, polyurethane and the like are preferably used. The silicon resin is particularly preferably used.

As shown in FIG. 2A, at the time of starting the operation of the fuel cell, the balloon exhaust solenoid valve 1659 is opened, and the oxidizing agent 126 in the balloon 1652 is exhausted from the balloon outlet 1676 by a suction pump 1678. As a result, the balloon 1652 is constricted. Therefore, the surface of the balloon 1652 is separated from the oxidizing agent electrode 108, and the oxidizing agent passage 312 is opened. Also, the balloon injection solenoid valve 1654 is closed and the oxidizing agent passage solenoid valve 1658 is opened. Thereby, the oxidizing agent is supplied to the unit cell 101 via the oxidizing agent passage 312. The air discharge solenoid valve 1656 is firstly closed. When the supply amount of the oxidizing agent to the oxidizing agent electrode 108 becomes sufficient, the air discharge solenoid valve 1656 is opened. In this way, the oxidizing agent 126 is supplied to the oxidizing agent electrode 108. Thereby, the operation of the fuel cell is started.

The balloon injection solenoid valve 1654 is kept closed during the operation of the fuel cell, and the oxidizing agent passage solenoid valve 1658 and the air discharge solenoid valve 1656 are kept opened. Thereby, the oxidizing agent is supplied to the unit cell 101 via the oxidizing agent passage 312. The balloon exhaust solenoid valve 1659 is kept opened. As a result, the oxidizing agent 126 is not injected into the balloon 1652, and the balloon 1652 maintains the contraction shape.

On the other hand, as shown in FIG. 2B, when stopping the operation of the fuel cell, the oxidizing agent passage solenoid valve 1658 of the changeover valve structure 1650 is closed. The air discharge solenoid valve 1656 and the balloon injection solenoid valve 1654 are opened. On the other hand, the balloon exhaust solenoid valve 1659 is closed. Thereby, the oxidizing agent 126 is supplied into the balloon 1652 from the oxidizing agent introducing port 1653, and the balloon 1652 is expanded. The expanded balloon 1652 blocks the oxidizing agent passage 312, and the supply of the oxidizing agent 126 to the oxidizing agent electrode 108 is stopped. That is, the balloon 1652 to which the oxidizing agent 126 is supplied is expanded, and the oxidizing agent electrode 108 and the solid electrolyte membrane 114 are covered with the balloon 1652, and the oxidizing agent passage 312 is sealed. As mentioned above, when the operation of the fuel cell is stopped, the fuel 124, moisture and the like of the side of the fuel electrode 102 can be prevented from passing through the solid electrolyte membrane 114 to flow out to the side of the oxidizing agent electrode 108, and the excessive evaporation of the fuel 124 can be suppressed. Since the air discharge solenoid valve 1656 is opened, the burst of the balloon 1652 due to the excessive supply of the oxidizing agent 128 into the balloon 1652 can be prevented.

In the present embodiment, a simple device containing the changeover valve structure 1650 and the balloon exhaust solenoid valve 1659 is used, and the oxidizing agent 126 guided to the oxidizing agent passage 312 during the operation of the fuel cell is guided to the balloon 1652 during the operation stop of the fuel cell. Therefore, the excessive evaporation of the fuel 124 and moisture can be suppressed without causing the complication of the structure of the fuel cell such as the provision of a path for introducing gas separately in order to inject the oxidizing agent into the balloon 1652.

Figure 3:
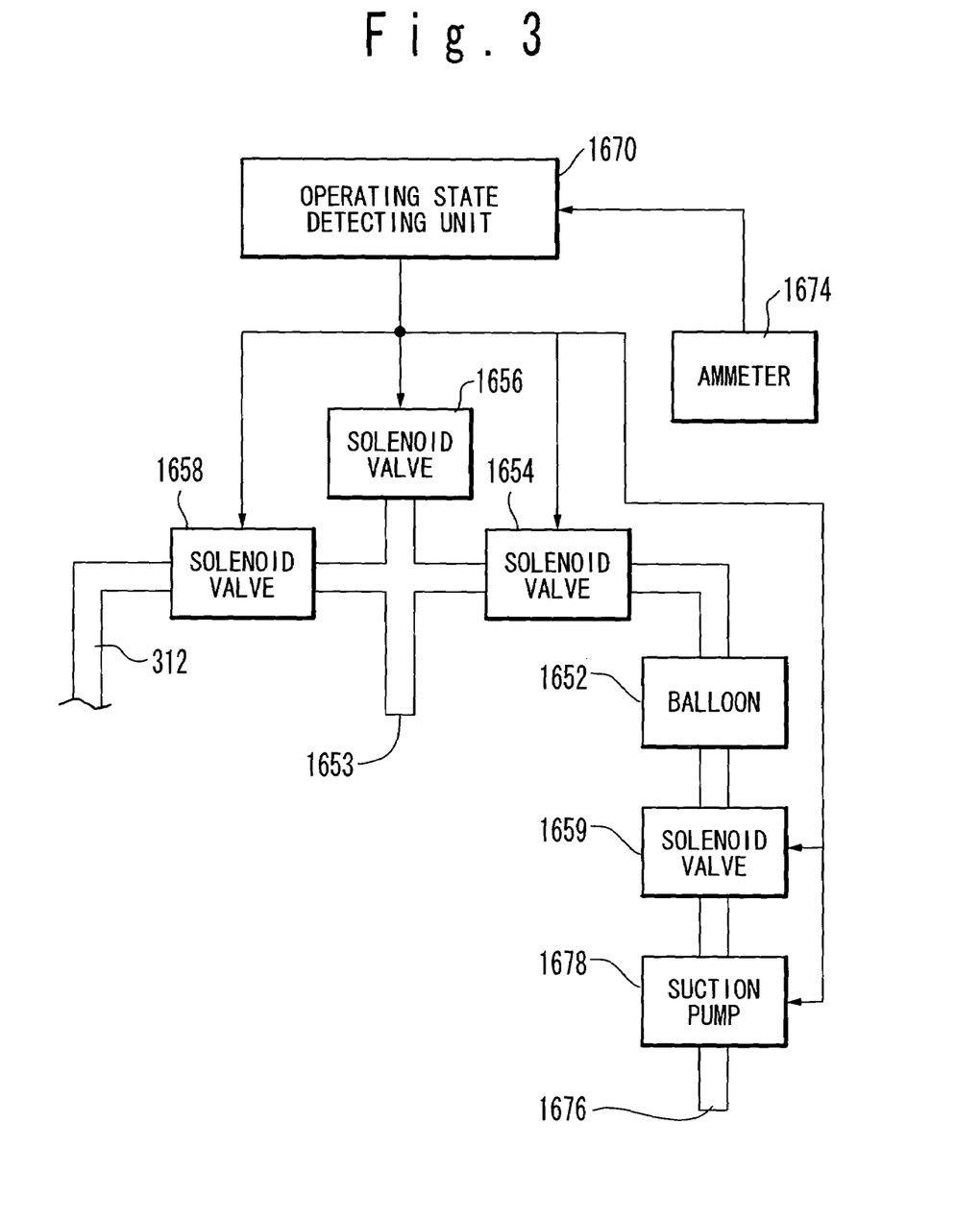
FIG. 3 is a block diagram showing a controlling system of an opening/closing member in the first embodiment of the present invention.

FIG. 3 is a block diagram showing a controlling system of the balloon 1652 of the first embodiment. Herein, the controlling system has a function as the gas guide unit.

An operating state detecting unit 1670 detects whether the fuel cell is in an operation state or the fuel cell is in an operation stopping state using the ammeter 1674. The operating state detecting unit 1670 issues a command for opening or blocking the balloon injection solenoid valve 1654, the air discharge solenoid valve 1656, the oxidizing agent passage solenoid valve 1658 and the balloon exhaust solenoid valve 1659. Each of the solenoid valves responds to the command to be opened or blocked, and the change in the shape of the balloon 1652, the supply of the oxidizing agent 126 to the oxidizing agent electrode 108, and the air discharge of the oxidizing agent 126 are controlled. As a result, when the fuel cell is stopped, the outflow of the fuel 124, moisture and the like of the side of the fuel electrode 102 to the side of the oxidizing agent electrode 108 is automatically suppressed. The excessive evaporation of the fuel 124 can be suppressed without complicating the structure of the fuel cell.

Although an example in which the balloon 1652 is constricted by using the suction pump 1678 at the time of starting the operation is described in the present embodiment, the balloon 1652 may be constricted by naturally exhausting the oxidizing agent from the balloon outlet 1676 without using the suction pump. The balloon 1652 may be constricted by naturally exhausting the oxidizing agent from the oxidizing agent introducing port 1653 without providing the balloon outlet 1676 and the balloon exhaust solenoid valve 1659.

Figure 2C:
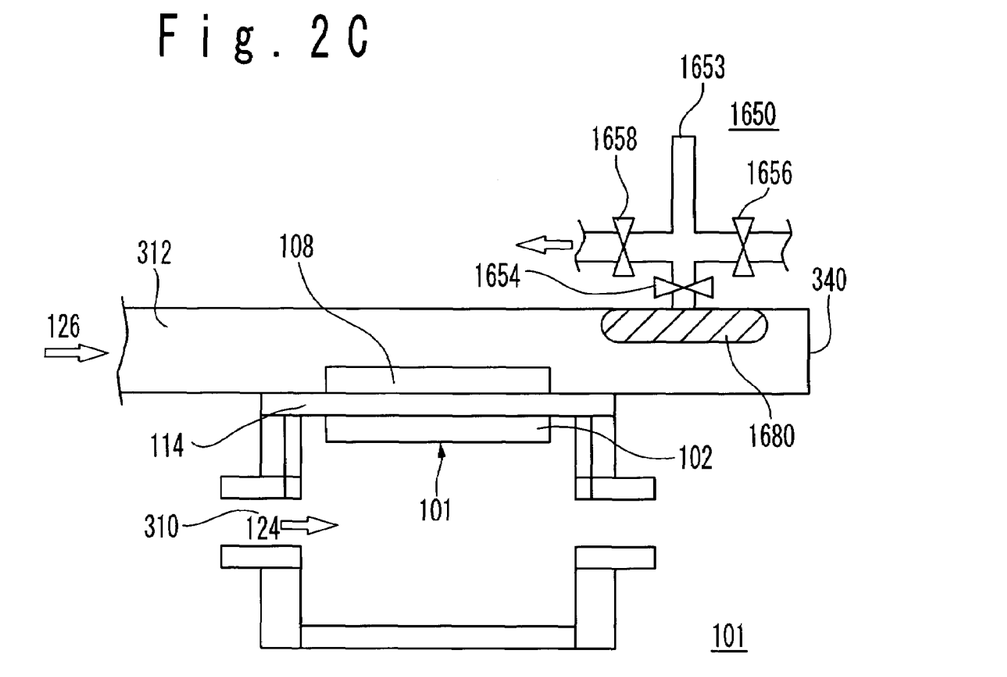
FIG. 2C shows a condition that a balloon is constricted, which is provided near an outlet of an oxidizing agent passage of a fuel cell according to the modification of the first embodiment of the present invention.
Figure 2D:
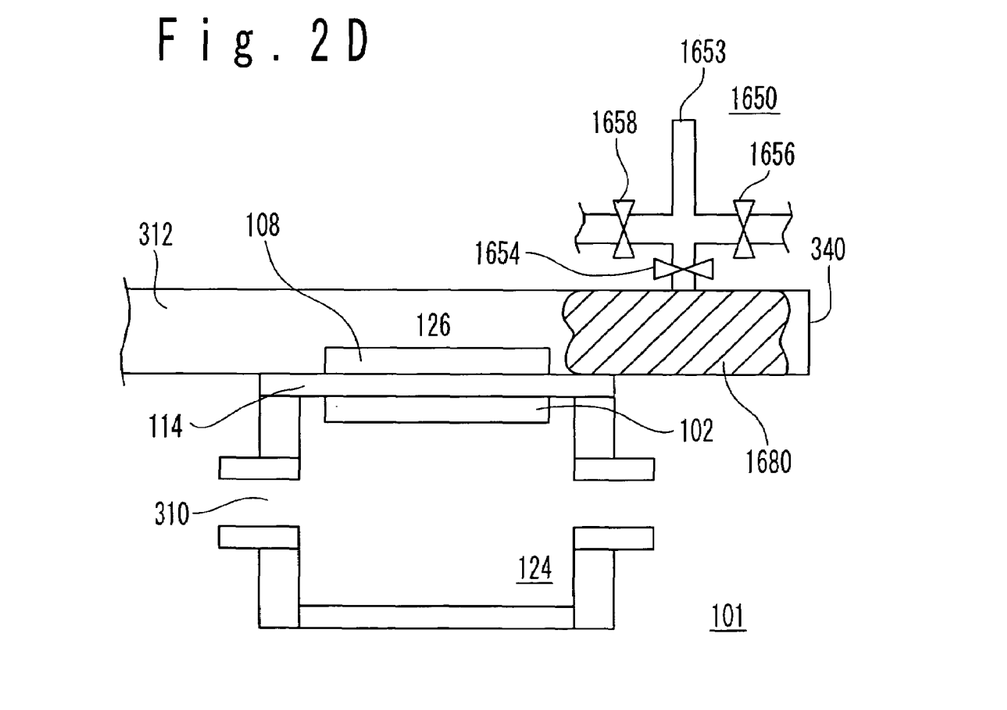
FIG. 2D shows a condition that the balloon is expanded, which is provided near the outlet of the oxidizing agent passage of the fuel cell according to the modification of the first embodiment of the present invention.

In the first embodiment, the example in which the excessive evaporation of the fuel 124 and moisture is suppressed by covering the oxidizing agent electrode 108 with the balloon 1652 is described. However, as shown in FIGS. 2C and 2D, the oxidizing agent passage 312 may be blocked by expanding a balloon catheter 1680 attached near the outlet 340 of the oxidizing agent passage 312. In this case, in order to expand the balloon catheter 1680, as shown in FIGS. 2A and 2B, the changeover valve structure 1650 is connected to the balloon catheter 1680. An exhaust passage having a solenoid valve 1659 and the pump 1678 may be provided.

Although the air discharge solenoid valve 1656 is opened at the time of the operation stop of the fuel cell in the present embodiment, the air discharge solenoid valve 1656 may be closed to the completion of expansion of the balloon 1652 from the operation stop of the fuel cell, and the air discharge solenoid valve 1656 may be opened after the completion of expansion of the balloon 1652. Thereby, the balloon 1652 is more promptly expanded, and the oxidizing agent supply path can be promptly closed at the time of the operation stop. Thereby, the excessive evaporation of the fuel 124 and moisture can be more effectively suppressed.

In the present embodiment, the oxidizing agent 126 supplied to the oxidizing agent electrode 108 at the time of the operation of the fuel cell is introduced into the balloon 1652 at the time of the operation stop of the fuel cell. However, a mechanism for introducing gas into the balloon may be provided together with the introduction of the oxidizing agent 126, or the mechanism may be separately provided. Thereby, the balloon 1652 is more promptly expanded, and the oxidizing agent supply path can be rapidly and promptly closed at the time of the operation stop. Thereby, the excessive evaporation of the fuel 124 can be more effectively suppressed.

Second Embodiment

Figure 4A:
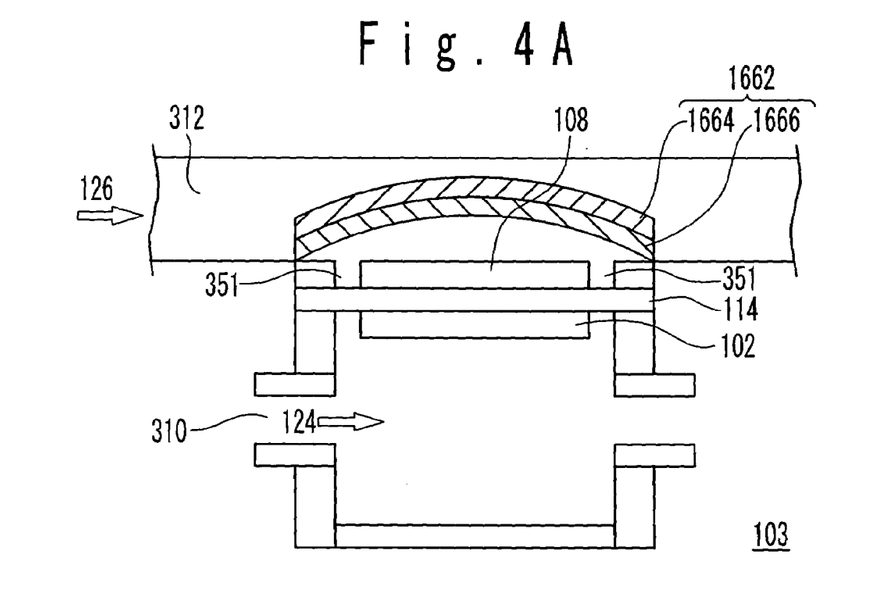
FIG. 4A shows a condition that a junction plate is curved at the time of operating the fuel cell according to the second embodiment of the present invention.
Figure 4B:
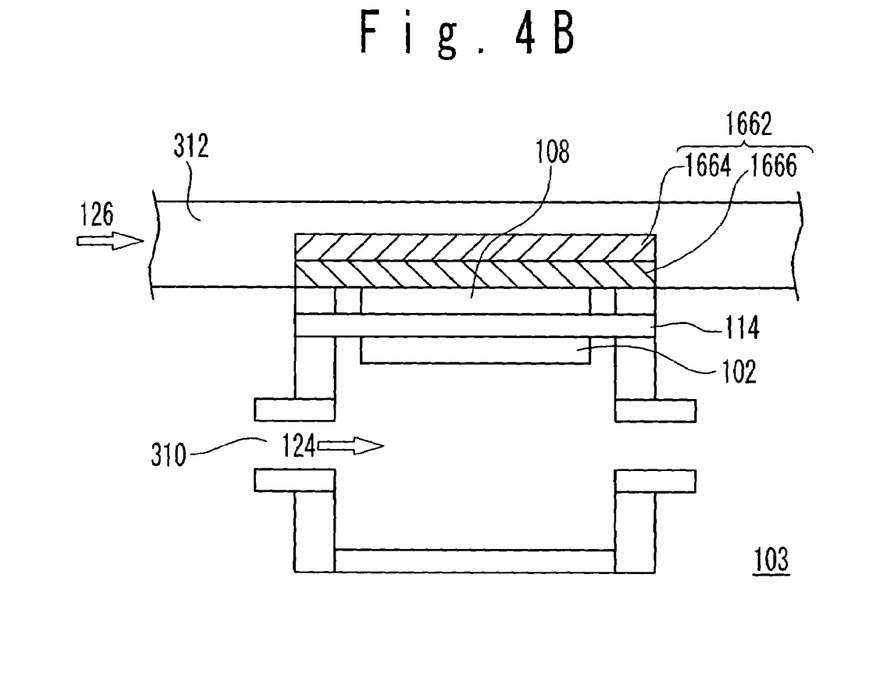
FIG. 4B shows a condition that the junction plate is expanded at the time of stopping the fuel cell according to the second embodiment of the present invention.

A fuel cell according to a second embodiment of the present invention will be described. In the fuel cell according to the second embodiment, an opening/closing member in which the shape of a plate obtained by combining two or more plate-like members whose thermal expansion ratios are different is changed will be described. Specifically, FIGS. 4A and 4B show a condition that the shape of a junction plate 1662 obtained by combining a metal plate 1664 and a resin plate 1666 is changed according to the operation situation of the fuel cell.

The surface of the oxidizing agent electrode 108 of a unit cell 101 is provided along the wall of the oxidizing agent passage 312, and the fuel electrode 102 is provided in the fuel passage 310. An electrolyte membrane 114 is provided along the oxidizing agent passage 312. A space 351 is formed by the wall of the oxidizing agent passage 312, the electrolyte membrane 114 and the oxidizing agent electrode 108.

The fuel cell is provided with the junction plate 1662 obtained by combining the metal plate 1664 and the resin plate 1666 set at the inner side of the oxidizing agent passage 312. The junction plate 1662 is constituted by connecting the resin plate 1666 and the metal plate 1664 in this order from a near side of the oxidizing agent electrode 108. The junction plate 1662 is curved away from the side of the oxidizing agent electrode 108 at high temperatures by the difference between the thermal expansion ratio of the metal plate 1664 and that of the resin plate 1666, and is straightened at low temperatures. The four corners of the junction plate 1662 are fixed to the oxidizing agent passage 312 of the side of the oxidizing agent electrode 108 by screws and the like. Thereby, the oxidizing agent can flow along the surface of the oxidizing agent electrode 108 at high temperatures.

Herein, a metal material having a high thermal expansion ratio is preferably used as the metal plate 1664. Cu, Ni, a Cu—Zn alloy, a 70% Ni—Cu alloy, a 20% Ni—Mn—Fe alloy, a Ni—Cr—Fe alloy, a 20% Ni—Mo—Fe alloy, a 70% Mn—Ni—Cu alloy, a Cu—Sn—P alloy and the like are particularly preferably used. As the resin plate 1666, a resin having low thermal expansion ratio is preferably used, and a fiber strengthening resin (FRP) and the like such as an epoxy resin, a phenol resin and a glass fiber reinforcing polyester are particularly preferably used. Herein, a silane coupling agent and the like may be used on the interface of the metal plate 1664 and a resin plate 1666 as an adhesive.

At the time of starting the operation of the fuel cell, a power generation operation is carried out by using the oxidizing agent remaining in the space 351 and the oxidizing agent electrode 108. Heat is generated from the electrolyte membrane 114 through the power generation operation, and the junction plate 1662 is curved by the heat. As a result, the oxidizing agent can flow along the oxidizing agent electrode 108.

Since heat is occurred by electrochemical reaction in both the fuel electrode 102 and the oxidizing agent electrode 108 during the operation of the fuel cell, as shown in FIG. 4A, the junction plate 1662 is further curved. Thereby, the supply of the oxidizing agent 126 to the oxidizing agent electrode 108 and the discharge of water generated from the oxidizing agent electrode 108 are smoothly carried out at the side of the oxidizing agent electrode 108.

On the other hand, when the operation of the fuel cell is stopped, the electrochemical reaction in both the fuel electrode 102 and the oxidizing agent electrode 108 is stopped. Therefore, the temperature of the junction plate 1662 is decreased, and approaches room temperature as the time passes by. As a result, as shown in FIG. 4B, the junction plate 1662 is straightened, and the oxidizing agent electrode 108 is covered with the junction plate 1662. Therefore, when the operation of the fuel cell is stopped, the fuel 124, moisture and the like of the side of the fuel electrode 102 can be prevented from passing through the solid electrolyte membrane 114 to flow out to the side of the oxidizing agent electrode 108, thereby suppressing the excessive evaporation of the fuel 124 and moisture.

As mentioned above, in the second embodiment, the shape of the junction plate 1662 is changed by the difference of the temperatures during the operation and stop of the fuel cell, thereby covering and releasing the oxidizing agent electrode 108. Since the oxidizing agent supply path is closed and opened by such a mechanism, the excessive evaporation of the fuel 124 and moisture can be suppressed by the simple structure.

Although the embodiment using the junction plate 1662 obtained by combining the metal plate 1664 and the resin plate 1666 is described in the second embodiment, for example, there may be used a junction plate obtained by combining three or more plates such as a junction plate composed by two metal plates and one resin plate (three plates in total).

Although the embodiment using the junction plate 1662 obtained by combining the metal plate 1664 and the resin plate 1666 is described in the second embodiment, there may be used a bimetal plate which is a plate obtained by combining metal plate-like members. As the above bimetal plate, for example, a Ni—Fe alloy and the like which are a material having a low thermal expansion ratio can be used. Cu, Ni, a 70% Cu—Zn alloy, a 70% Ni—Cu alloy, a 20% Ni—Mn—Fe alloy, a Ni—Cr—Fe alloy, a 20% Ni—Mo—Fe alloy, a 70% Mn—Ni—Cu alloy, and a Cu—Sn—P alloy and the like can be used as a material having high thermal expansion ratio. As the material having the low thermal expansion ratio, a Ni—Fe alloy of which Ni content is 36 to 46% by weight is preferably used. A Ni—Fe alloy of 36 to 38% by weight is particularly preferably used. As the material having the high thermal expansion ratio, Cu, Ni, a Cu—Zn alloy and a Cu—Sn—P alloy are preferably used. A Ti—Ni alloy which is a shape-memory alloy can be also used.

Although the embodiment in which the junction plate 1662 whose thermal expansion ratios are different is used is described in the second embodiment, a junction plate obtained by combining two or more materials whose swelling rates are different may be used.

Figure 4C:
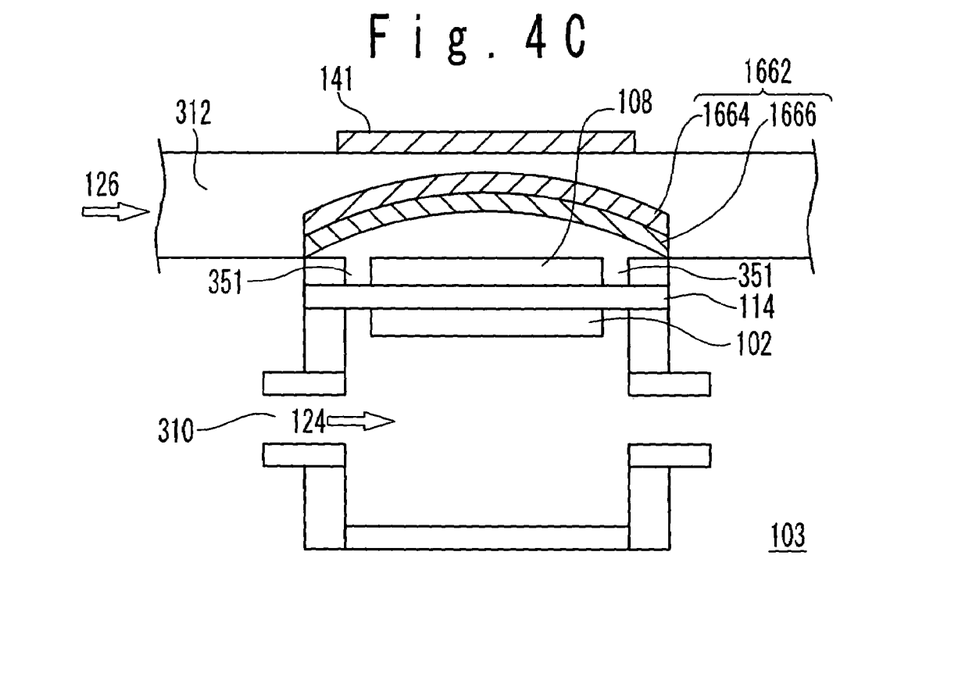
FIG. 4C shows a fuel cell in which a heater is provided on the outside of an oxidizing agent passage in the fuel cell according to the modification of the second embodiment of the present invention.
Figure 4D:
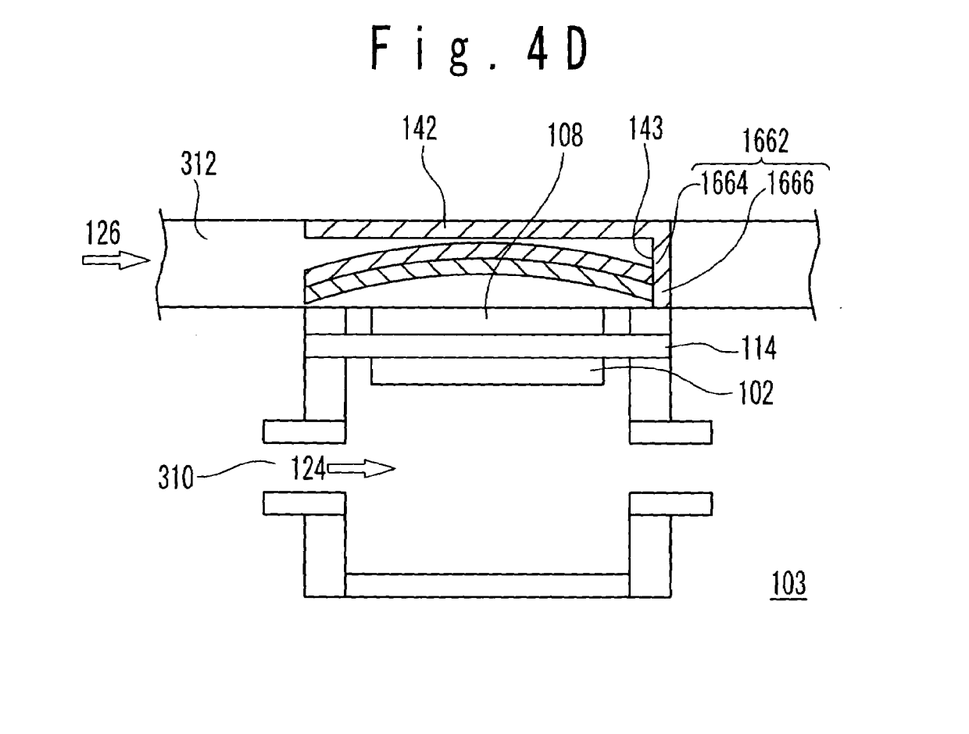
FIG. 4D shows a fuel cell in which a heater is provided on the outside of an oxidizing agent passage in the fuel cell according to the modification of the second embodiment of the present invention.

The example in which the shape of the junction plate 1662 is changed by the presence or absence of generation of heat due to the electrochemical reaction in both the fuel electrode 102 and the oxidizing agent electrode 108 is described in the second embodiment. However, a heat source may be provided together with the example, or the heat source may be separately provided. For example, as shown in FIG. 4C, a heater 141 may be provided at a position of the outside of the oxidizing agent passage 312 corresponding to the junction plate 1662. At the time of starting, the heater 141 is energized and heated. The junction plate 1662 is curved by the heat, and a normal operation may be then carried out. As shown in FIG. 4D, a heater 142, and an electrothermal plate 143 connected to the heater 142 and the junction plate 1662 may be provided at a position of the inside of the oxidizing agent passage 312 corresponding to the junction plate 1662. At the time of starting, the heater 142 is energized and heated. The heat is transmitted to the junction plate 1662 by the electrothermal plate 143, curving the junction plate 1662, and a normal operation may be then carried out. The junction plate 1662 is promptly curved in these examples, and the junction plate 1662 is promptly separated from the oxidizing agent electrode 108 and the solid electrolyte membrane 114 at the time of starting the operation. As a result, the operation of the fuel cell can be promptly resumed while the excessive evaporation of the fuel 124 and moisture is suppressed.

Third Embodiment

Figure 5A:
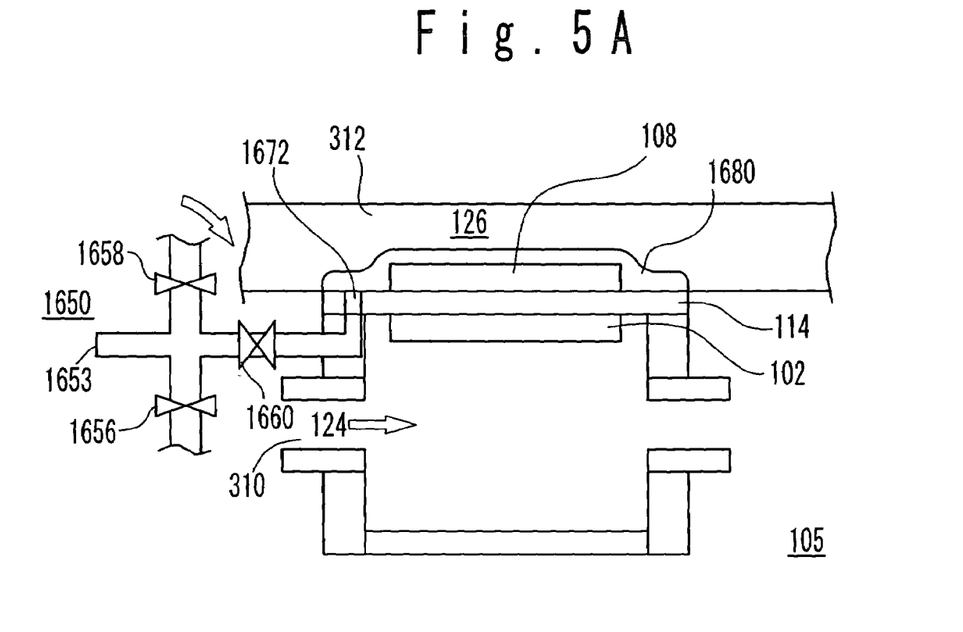
FIG. 5A shows a condition that an elastic body sheet is constricted at the time of operating a fuel cell according to the third embodiment of the present invention.
Figure 5B:
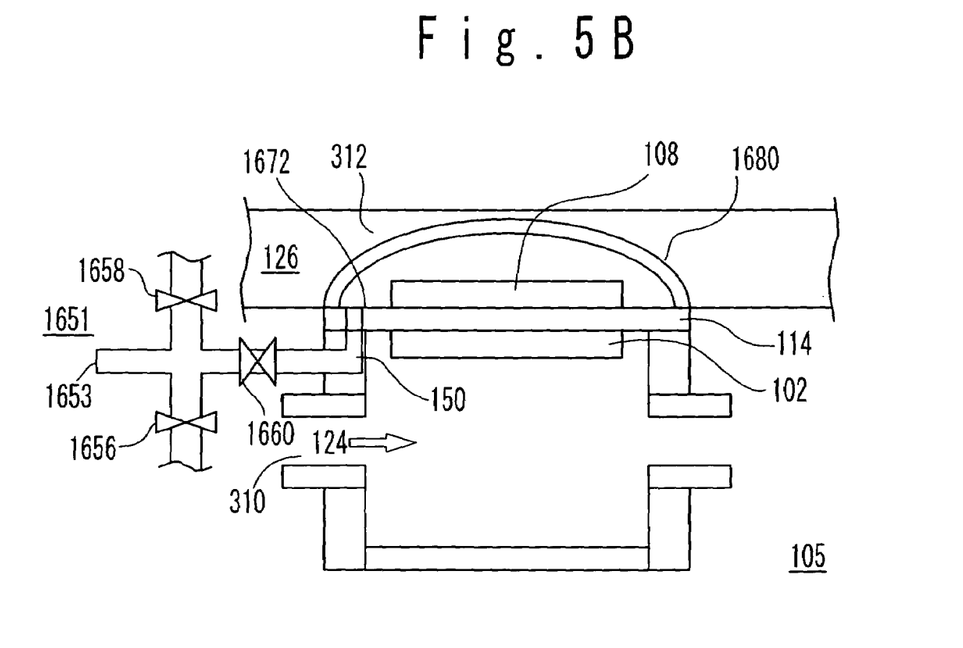
FIG. 5B shows a condition that the elastic body sheet is expanded at the time of stopping the fuel cell according to the third embodiment of the present invention.

FIGS. 5A and 5B show an example in which the shape of an elastic body sheet 1680 as an opening/closing member for opening and closing an oxidizing agent supply path is changed according to the operation situation of a fuel cell in a third embodiment.

The oxidizing agent electrode 108 of a unit cell 101 is provided along the wall of the oxidizing agent passage 312, and the fuel electrode 102 is provided in the fuel passage 310. The electrolyte membrane 114 is provided along the wall of the oxidizing agent passage 312. A passage 150 as a part of the oxidizing agent passage 312 is formed in the wall of the fuel passage 310 connected to the electrolyte membrane 114.

The elastic body sheet 1680 is provided at the inside of the oxidizing agent passage 312 in a unit cell 105. The four corners of the elastic body sheet 1680 are fixed to the side of the oxidizing agent electrode 108 by pins and the like (not shown). There is provided a changeover valve structure 1651 having the same structure as that of the changeover valve structure 1650 used in the first embodiment. The difference between the changeover valve structure 1650 and the changeover valve structure 1651 is that a solenoid valve 1654 of the changeover valve structure 1650 is replaced with a solenoid valve 1660 in the changeover valve structure 1651. Therefore, the structure and operation of a changeover valve structure 1651 will be obvious from the description of the first embodiment. The output of the solenoid valve 1660 is connected to the passage 150, and an oxidizing agent is supplied to the inside of the elastic body sheet 1680 from a supply port 1672. An oxidizing agent introducing port 1653 of the changeover valve structure 1651, a solenoid valve 1658, and the air discharge solenoid valve 1656 are operated in the same manner as in those of the first embodiment. Herein, an oxidizing agent introducing port 1653, the changeover valve structure 1651, a oxidizing agent supply solenoid valve 1660 and the supply port 1672 function as the gas guide unit for guiding gas to the closed space constituted by the elastic body sheet 1680 and the oxidizing agent electrode 108.

Herein, resins such as plastics which have no breathability and have tolerance to the liquid fuel and elasticity are used as the elastic body sheet 1680. Specifically, a silicon resin, rubber, polyurethane and the like are preferably used, and the silicon resin is particularly preferably used.

As shown in FIG. 5B, steam is generated by electrochemical reaction in the oxidizing agent electrode 108 during the operation of the fuel cell. Therefore, although a negative internal pressure in the fuel passage 310 produced based on Bernoulli's theory is generated by the flow of the fuel 124, the shape of the elastic body sheet 1680 is curved. Therefore, the elastic body sheet 1680 is distant from the oxidizing agent electrode 108, enabling the supply of the oxidizing agent 126 to the oxidizing agent electrode 108 and the discharge of water generated from the oxidizing agent electrode 108.

On the other hand, as shown in FIG. 5A, since the electrochemical reaction in the oxidizing agent electrode 108 is stopped when the operation of the fuel cell is stopped, the steam is not generated. Then, the negative pressure produced based on the Bernoulli's theory is generated by continuing the circulation of the fuel 124 in the fuel passage 310 in fixed time after the operation stop of the fuel cell. Therefore, the elastic body sheet 1680 is sucked toward the side of the oxidizing agent electrode 108. Thereby, the elastic body sheet 1680 is adsorbed so as to meet the shape of the oxidizing agent electrode 108, and the oxidizing agent electrode 108 and the solid electrolyte membrane 114 are covered with the elastic body sheet 1680. As a result, when the operation of the fuel cell is stopped, the fuel 124, moisture and the like of the side of the fuel electrode 102 can be prevented from passing through the solid electrolyte membrane 114 to flow out to the side of the oxidizing agent electrode 108, thereby suppressing the excessive evaporation of the fuel 124 and moisture.

When the operation of the fuel cell is resumed, the solenoid valve 1660 is opened simultaneously with opening the oxidizing agent passage solenoid valve 1658 and supplying the oxidizing agent 126 to the oxidizing agent passage 312, and thereby the oxidizing agent 126 is guided to a face surrounded by the elastic body sheet 1680, the oxidizing agent electrode 108 and the solid electrolyte membrane 114 from the supply port 1672 via the passage 150. Thereby, the adsorption of the elastic body sheet 1680, the oxidizing agent electrode 108 and the solid electrolyte membrane 114 is removed. Therefore, since the steam is generated from the oxidizing agent electrode 108 along with the operation resumption of the fuel cell, the shape of the elastic body sheet 1680 is returned to the curved shape. As a result, the oxidizing agent 126 can be supplied to the oxidizing agent electrode 108 and the water generated from the oxidizing agent electrode 108 can be discharged, thereby enabling the continuation of the operation of the fuel cell.

Therefore, the excessive evaporation of the fuel 124 and moisture can be suppressed without complicating the structure of the fuel cell by guiding the oxidizing agent 126 to the space surrounded by the elastic body sheet 1680, the oxidizing agent electrode 108 and the solid electrolyte membrane 114 at the time of the operation resumption of the fuel cell using the changeover valve structure 1651 as the simple device.

In the third embodiment, the example for guiding the oxidizing agent 126 to the oxidizing agent passage 312 and the adsorption destruction oxidizing agent supply port 1672 at the time of starting the operation of the fuel cell is described. However, a mechanism for introducing gas into the supply port 1672 may be provided together with the example, or the mechanism may be separately provided. Thereby, the adsorption destructive speed of the elastic body sheet 1680 has risen, and a speed for separating the elastic body sheet 1680 from the oxidizing agent electrode 108 and the solid electrolyte membrane 114 becomes fast at the time of the operation resumption of the fuel cell. Therefore, the operation resumption of the fuel cell can be promptly carried out while the excessive evaporation of the fuel 124 and moisture is suppressed.

Fourth Embodiment

Figure 6:
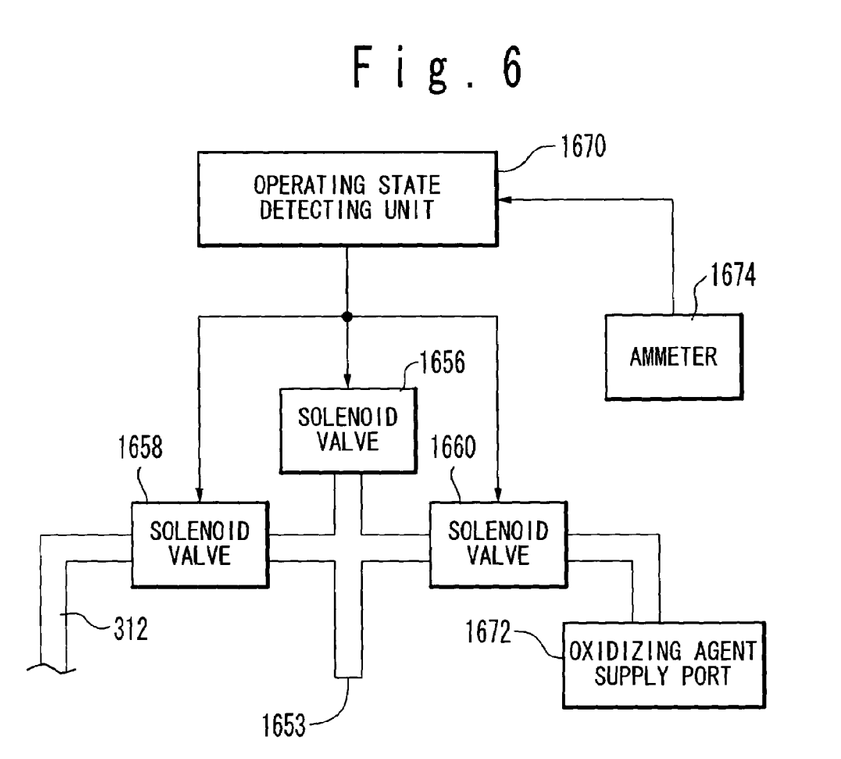
FIG. 6 is a block diagram showing a controlling system of an opening/closing member in the third embodiment of the present invention.

FIG. 6 describes a controlling system of an elastic body sheet 1680 of the present embodiment. Herein, the above system has a function as the gas guide unit.

An operating state detecting unit 1670 detects whether a fuel cell is in an operation state or the fuel cell is in an operation stopping state or the fuel cell is at the time of the starting the operation using the output of the ammeter 1674. The operating state detecting unit 1676 issues a command so as to open or blockade the solenoid valve 1660, a solenoid valve 1656 and a solenoid valve 1658. Each of the solenoid valves is opened or blockaded by the command, and the supply of the oxidizing agent 126 to a supply port 1672, the supply of the oxidizing agent 126 to the oxidizing agent electrode 108, and the air discharge of the oxidizing agent 126 are controlled.

Specifically, during the operation of the fuel cell, the solenoid valve 1660 is blockaded, and the solenoid valve 1658 is opened. The solenoid valve 1656 is blockaded when the supply amount of the oxidizing agent 126 to the oxidizing agent electrode 108 is insufficient, and the solenoid valve 1656 is opened when the supply amount is sufficient. During the operation stop of the fuel cell, the solenoid valve 1660 and the solenoid valve 1658 are blockaded, and the solenoid valve 1656 is opened. At the time of starting the operation of the fuel cell, the solenoid valve 1660 and the solenoid valve 1658 are opened, and the solenoid valve 1656 is blockaded. These operations are the same as those of the first embodiment. The operating state detecting unit 1670 controls the solenoid valve (not shown) so that the fuel is supplied to the fuel supply path 310 for a given length of time when the stop of the operation of the fuel cell is indicated.

As a result, when the fuel cell is stopped, the outflow of the fuel 124, moisture and the like of the side of the fuel electrode 102 to the side of the oxidizing agent electrode 108 is automatically suppressed. In addition, the adsorption destruction of the elastic body sheet 1680 is automatically carried out at the time of starting the operation of the fuel cell. Thereby, the excessive evaporation of the fuel 124 can be suppressed without complicating the structure of the fuel cell.

Also, in a fourth embodiment, the example of the controlling system for guiding the oxidizing agent 126 to the oxidizing agent passage 312 and the adsorption destruction oxidizing agent supply port 1672 at the time of starting the operation of the fuel cell is described. However, a system for introducing gas into the supply port 1672 may be provided together with the example, or the system may be separately provided. Thereby, the adsorption destructive speed of the elastic body sheet 1680 has risen, and a speed for the separation of the elastic body sheet 1680 from the oxidizing agent electrode 108 and the solid electrolyte membrane 114 becomes fast at the time of resuming the operation of the fuel cell. As a result, the operation resumption of the fuel cell can be promptly carried out while the excessive evaporation of the fuel 124 and moisture is suppressed.

As mentioned above, the suitable embodiments of the present invention is described. However, the present invention is not limited to the above embodiments, and it is needless to say that a person skilled in the art can modify the above embodiments within the range of the present invention.

Figure 7:
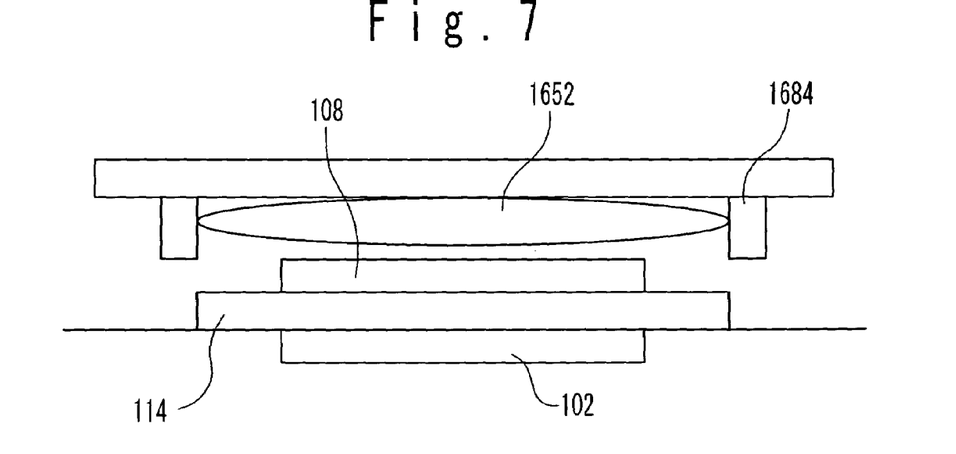
FIG. 7 is a sectional view diagrammatically showing the constitution of an opening/closing member in the modification of the first embodiment of the present invention.

For example, the embodiment in which the guide for guiding so that the balloon 1652 covers the oxidizing agent electrode 108 and the solid electrolyte membrane 114 is not provided is described in the first embodiment. However, a guide 1684 as shown in FIG. 7 may be provided. Thereby, the balloon 1652 is correctly guided without separating from the surfaces of the oxidizing agent electrode 108 and the solid electrolyte membrane 114. As a result, the fuel 124, moisture and the like of the side of the fuel electrode 102 can be prevented from passing through the solid electrolyte membrane 114 to flow out to the side of the oxidizing agent electrode 108, thereby suppressing the excessive evaporation of the fuel 124 and moisture. Herein, it should be noted that the changeover valve structure 1650 and the like are omitted in FIG. 7.

The quality of the material of the guide 1684 needs to be attached to the oxidizing agent passage 312 and have tolerance to the oxidizing agent 126 and the fuel 124. For example, polypropylene, polyethylene, PTFE, polyacetal and the like are preferably used.

Figure 8:
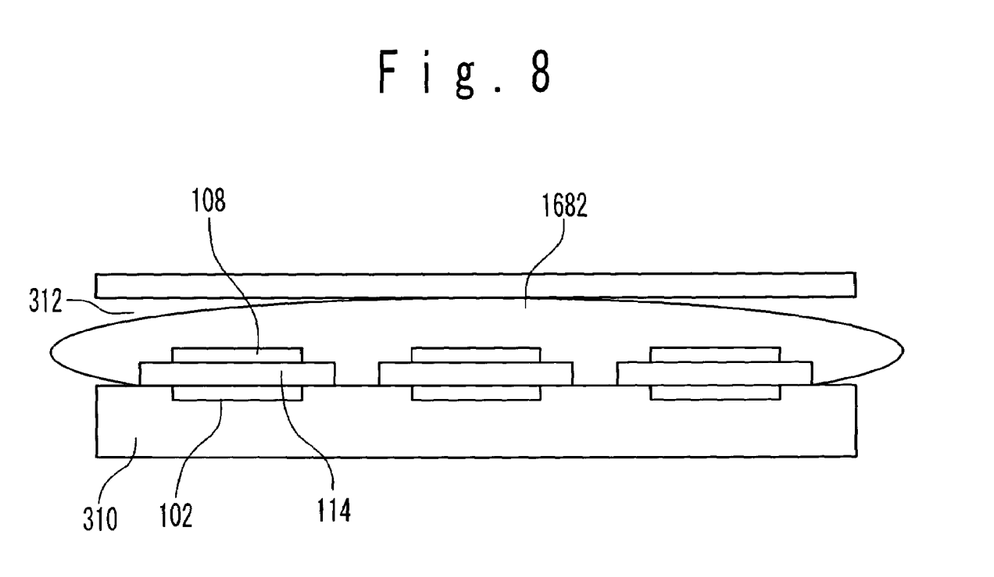
FIG. 8 is a sectional view diagrammatically showing the constitution of an opening/closing member in another modification of the first embodiment of the present invention.

Although the example in which the oxidizing agent electrode of the independent cell is covered is described in the above embodiment, as shown in FIG. 8, the balloon 1682 may cover the plurality of oxidizing agent electrodes when a plane stack structure where a plurality of cells are arranged parallel in the same plane is adopted. Particularly, if the whole stack structure is covered, the evaporation of the fuel can be more efficiently suppressed. Herein, it should be noted that the changeover valve structure 1650 and the like are omitted in FIG. 8.

Also, in this case, the evaporation of the fuel can be suppressed by using the simple devices such as the changeover valve structure and the balloon exhaust solenoid valve for the balloon 1682 in the same manner as in the above embodiment. When the above plane stack structure is adopted, the plurality of oxidizing agent electrodes may be covered with the junction plate, and may be covered with the elastic body sheet.

Although the embodiment in which the silicon resin and the like are used as the elastic body sheet is described in the above-mentioned embodiment, any material having no breathability and having chemical resistance and elasticity may be used. Specific examples include polyethylene, polypropylene, PTFE and polyacetal.

Although the example using the organic liquid fuel as the fuel is shown in the above embodiment, the present invention can be also applied to the fuel cell using hydrogen as the fuel.

Also, in the first embodiment, the embodiment in which the balloon injection solenoid valve 1654, the air discharge solenoid valve 1656, the oxidizing agent passage solenoid valve 1658 and the balloon exhaust solenoid valve 1659 are incorporated into in the controlling system in a separate form is described. However, for example, a multi-port valve such as a four port valve and a five port valve may be used, furthermore the balloon injection solenoid valve 1654 and the like and the multi-port valve may be used together. The combination and the like of various valves using the multi-port valve may be used. When the multi-port valve is used, the same fluid piping path as one described in the first embodiment can be constructed, and the path of fluid of the oxidizing agent and the like can be simplified. Therefore, the miniaturization of the controlling system can be attained. The above multi-port valve and the like may be used in the third and fourth embodiments.

Although the embodiment in which the burst of the balloon 1652 due to the supply of the excessive oxidizing agent 128 is prevented by opening and closing the air discharge solenoid valve 1656 is described in the first embodiment, for example, the burst of the balloon 1652 may be prevented by maintaining the pressure in the balloon 1652 below a desired pressure by using various kinds of valves such as a leak valve. In the third and fourth embodiments, the various kinds of valves such as the above-mentioned leak valve may be used.

The invention claimed is:

1. A fuel cell comprising:

a fuel electrode and an oxidizing agent electrode;

a fuel supply path configured to supply a liquid fuel to the fuel electrode; an oxidizing agent supply path configured to supply an oxidizing agent to the oxidizing agent electrode; and an opening/closing member configured to open and close said oxidizing agent supply path by changing its shape, wherein said opening/closing member is configured to cover said oxidizing agent electrode by changing its shape.

2. The fuel cell according to claim 1, further comprising;

a gas guide unit configured to input gas into a closed space formed by said opening/closing member and said oxidizing agent electrode, wherein said opening/closing member is separated from said oxidizing agent electrode by the gas being inputted to said closed space to open said oxidizing agent supply path.

3. The fuel cell according to claim 1, wherein said opening/closing member is a bag unit configured to be able to expand and shrink.

4. The fuel cells according to claim 3, further comprising;

a gas guide unit configured to input gas into said bag unit.

5. The fuel cells according to claim 3, wherein said gas guide unit is configured to input said oxidizing agent into said bag unit.

6. The fuel cells according to claim 1, wherein said opening/closing member is a plate configured to be combined at least two plate-like members, and coefficient of thermal expansion of said at least two plate like-members are different.

7. The fuel cells according to claim 6, wherein said plate is combined a metal plate-like member and a resin plate-like member.

8. The fuel cells according to claim 6, wherein said plate is combined metal plate-like members.

\* \* \* \* \*